(12) United States Patent
Batista et al.

(10) Patent No.: US 11,874,232 B2
(45) Date of Patent: Jan. 16, 2024

(54) INSPECTION STATION AND METHOD FOR INSPECTING SHEET MATERIAL

(71) Applicant: PHILIP MORRIS PRODUCTS S.A., Neuchatel (CH)

(72) Inventors: Rui Nuno Batista, Morges (CH); Ricardo Cali, Mannheim (DE)

(73) Assignee: Philip Morris Products S.A., Neuchatel (CH)

( * ) Notice: Subject to any disclaimer, the term of this patent is extended or adjusted under 35 U.S.C. 154(b) by 171 days.

(21) Appl. No.: 17/434,934

(22) PCT Filed: Mar. 4, 2020

(86) PCT No.: PCT/EP2020/055597
§ 371 (c)(1),
(2) Date: Aug. 30, 2021

(87) PCT Pub. No.: WO2020/178299
PCT Pub. Date: Sep. 10, 2020

(65) Prior Publication Data
US 2022/0146436 A1 May 12, 2022

(30) Foreign Application Priority Data
Mar. 5, 2019 (EP) .................................... 19160683

(51) Int. Cl.
*G01N 21/89* (2006.01)
*A24C 5/34* (2006.01)

(52) U.S. Cl.
CPC ..... *G01N 21/8914* (2013.01); *G01N 21/8903* (2013.01); *A24C 5/3412* (2013.01)

(58) Field of Classification Search
CPC ........... G01N 21/8914; G01N 21/8903; G01N 21/1717; G01N 21/8422;
(Continued)

(56) References Cited

U.S. PATENT DOCUMENTS

| 4,004,397 A * | 1/1977 | Hoffman | B65B 9/042 53/546 |
| 2011/0226061 A1* | 9/2011 | Itsumi | B65H 7/02 73/589 |

(Continued)

FOREIGN PATENT DOCUMENTS

WO    WO 2017/207116    12/2017

OTHER PUBLICATIONS

Ichiro et al "Apparatus for Inspecting Foreign Matter on Surface of Filmy Material", Jul. 28, 1995, JP H07190953A (Year: 1995).*

(Continued)

*Primary Examiner* — Sang H Nguyen
(74) *Attorney, Agent, or Firm* — Mueting Raasch Group

(57) ABSTRACT

The invention relates to an inspection station for crimped sheet material. The station comprises a light source to illuminate crimped sheet material in an inspection location, a vibrating device to vibrate crimped sheet material in the inspection location. The vibrating device comprises a vibrating element, wherein crimped sheet material is guidable along or over the vibrating element for the crimped sheet material to be vibrated by the vibrating element. The inspection station further comprises a detector for detecting light received from the vibrated crimped sheet material, thereby providing images of the crimped sheet material, and a controller to determine loose material on the crimped surface of the sheet material. The invention also relates to an inspection method and an apparatus comprising an inspection station.

14 Claims, 2 Drawing Sheets

(58) Field of Classification Search
CPC ... G01N 2021/1729; G01N 2021/8917; G01N 2021/8427; A24C 5/01; A24C 5/3412; A24B 3/14
See application file for complete search history.

(56) References Cited

U.S. PATENT DOCUMENTS

| | | | |
|---|---|---|---|
| 2012/0176490 A1 | 7/2012 | Bonham, Jr. | |
| 2015/0027475 A1* | 1/2015 | Jarriault | A24D 1/20 131/329 |
| 2015/0115976 A1 | 4/2015 | Adams | |
| 2015/0150302 A1* | 6/2015 | Metrangolo | A24C 5/18 131/230 |
| 2015/0163859 A1* | 6/2015 | Schneider | A24F 40/70 219/535 |
| 2018/0177228 A1 | 6/2018 | Pijnenburg | |
| 2018/0368465 A1* | 12/2018 | Rosado | A24B 7/00 |
| 2020/0135758 A1 | 4/2020 | Park et al. | |

OTHER PUBLICATIONS

Shingo "OVD Inspection Device and OVD Inspection Method", Mar. 21, 2008, JP 2008064579A (Year: 2008).*
Junichi et al "Ultrasonic Flaw Detection Method and Device Thereof", Aug. 15, 2013, JP 2013156277A (Year: 2013).*
Takahiro "Inspection Apparatus and Inspection Technique", Oct. 15, 2009, JP 2009236855A (Year: 2009).*
Diego et al "Apparatus and Method for Supplying a Continuous Web of Crimped Sheet Material", Sep. 4, 2014, KR 2014107200A (Year: 2014).*
PCT Search Report and Written Opinion for PCT/EP2020/055597 dated May 27, 2020 (18 pages).

* cited by examiner

INSPECTION STATION AND METHOD FOR INSPECTING SHEET MATERIAL

This application is a U.S. National Stage Application of International Application No. PCT/EP2020/055597 filed Mar. 4, 2020, which was published in English on Sep. 11, 2020, as International Publication No. WO 2020/178299 A1. International Application No. PCT/EP2020/055597 claims priority to European Application No. 19160683.9 filed Mar. 4, 2020.

The invention relates to an inspection station and a method for inspecting sheet material, in particular crimped sheet material. The invention also relates to an apparatus for manufacturing crimped sheet material comprising an inspection station.

Methods are known, where a continuous sheet material is crimped and gathered into a continuous rod, which rod is subsequently cut into individual segments. In particular, in aerosol-generating articles used in electronic devices specific continuous sheet material, for example polylactic acid, is used. The crimping of these materials is often performed by passing the continuous sheet material through a pair of structured rollers. Such a crimping may be affected by several factors, for example the condition of the crimping rollers or sheet conditions like temperature. On the other hand, crimping effects may directly have an impact on the physical parameters of the final rod, such as on a resistance to draw (RTD), on the diameter or ovality or on a hardness of the rod.

It is desirable to improve the manufacturing process of crimped sheet material in order to reduce quality issues in final rods made from the crimped sheet material and preferably to be able to provide a continuous production process of such rods.

According to the invention, there is provided an inspection station for sheet material, preferably for crimped sheet material, more preferably for continuous crimped sheet material. The inspection station comprises a light source arranged to illuminate a sheet material in an inspection location and comprises a vibrating device, which is preferably arranged at least partially in the inspection location. Preferably, the vibrating device is capable of an oscillating action at high frequencies in a range between 20 kHz and 70 kHz. The vibrating device is adapted to vibrate a sheet material in the inspection location. If the sheet material is a continuous sheet material then the vibrating device is preferable adapted to vibrate the sheet material in the inspection location when the continuous sheet material passes the vibrating device in the inspection location. The inspection station further comprises a detector, preferably a camera, for detecting light received from the vibrated sheet material, thereby providing images of the sheet material. A controller of the inspection station is adapted to determine from images of the sheet material loose material on a surface of the sheet material to get a true status of the crimped surface of the crimped sheet material. The controller is adapted to eliminate information on loose material from the images of the crimped sheet material. The controller is adapted to determine an image of the crimped surface calculating out loose material present on the crimped surface. Thus, by the inspection station the crimped surface of a crimped sheet material may be inspected despite any loose material possibly present on the surface. This is preferably done by dislodging said loose material during the inspection process in order for the loose material not to obstruct the inspection of the crimped surface.

Generally, during a crimping process sheet material gets pressed or deformed and material may dislodge, or dust may be gathered. This loose material remains at rollers of a crimping device as well as on the sheet material. The rollers may be cleaned while performing the crimping action, for example, by comb-shaped strippers. However, loose material on the sheet surface is not easily removed. In addition, some foil materials, such as for example polylactic acid (PLA) foil, tend to be electrostatically charged, leading to loose material to stick to the foil.

Loose material on the sheet material reduces the quality of a visual inspection. This generally applies to sheet material to be processed but is in particular applicable to visual inspection of a crimping effect of a sheet material.

Crimping creates surface structures in a sheet material. However, the crimping process can also damage the sheet material. The damaged parts need to be detected. In addition, loose material on the surface of the sheet material may have the same visual signature at high machine speed as non-conformities in the sheet material and may be mistaken for such non-conformities in the sheet material.

In order to be able to disregard removal of loose material during inspection from the sheet material, an inspection station is provided after the crimping, which inspection station allows to visually inspect the crimping effect without the need to remove loose material from the crimped sheet material.

In the inspection station the sheet material is optically inspected and vibrated, such that any loose material may be recognised from images taken from a same portion of the sheet material. Due to the vibration, loose material will be displaced on the surface of the sheet material while the sheet material is vibrated. Thus, a comparison of images of the same portion of the sheet material taken subsequently comprises information on the surface structure of the sheet material, including a crimping effect, as well as information on the displaced loose material not belonging to the sheet material. The displaced material can then be ignored for the determination of the surface quality of the crimped surface of the crimped sheet material. The results of the inspected surface, thus the determined surface quality of the crimped surface without loose material may then be used for adaption of a sheet material treatment process, in particular the crimping process of the sheet material.

With appropriate data and image processing, improved information on the surface structure, in particular the crimping effect may be gained. This information may be used for the sheet material processing. For example, via the controller, the information may be used to adapt a crimping process of the sheet material. It may in general be used to adapt a sheet material handling process. It may also be used to interrupt a sheet material processing, for example by interrupting a sheet transport device.

The vibrating device may be any vibrating device suitable for vibrating sheet material. For example, the vibrating device may be a shaker or may comprise an ultrasonic transducer.

Preferably, the vibrating device comprises an ultrasonic transducer.

The vibrating device may vibrate the sheet material while being in direct physical contact with the sheet material. The vibration of the sheet material by the vibrating device may also occur indirectly while the vibrating device is not in direct physical contact, for example via vibrating a support of the sheet material.

Preferably, the vibrating device comprises a vibrating element, which is preferably in direct physical contact with the sheet material to be vibrated. Preferably, a crimped sheet material is guidable along or over the vibrating element for the sheet material to be guided and vibrated by the vibrating element. Preferably, the vibrating element is a cylindrical bar.

The vibrating element may also be used as guide element for guiding the sheet material along its transport direction and preferably through the inspection location.

The vibrating element of the vibrating device may be arranged in the inspection location or close to the inspection location such that the sheet material to be inspected may pass the inspection location of the inspection station. For example, the vibrating element or vibrating device may be arranged upstream or downstream of the inspection location.

Preferably, the detector is a camera adapted to detect light from the vibrated sheet material. The detector may be arranged above the inspection location. The detector may also be arranged below the inspection location, for example when inspecting transparent sheet material and if the set-up of the inspection station allows for such a detection arrangement.

Different positioning options of the vibrating device and the detectors are advantageous if space is limited.

Preferably, the inspection station comprises two or more detectors for detecting light received from the vibrated sheet material under different angles.

Preferably, the two or more detectors have overlapping visions fields.

Preferably, the inspection station comprises two detectors having overlapping visions fields.

Preferably, the two or more detectors are arranged next to each other extending over the width of a transport path of the sheet material. If a sheet material is arranged in the inspection station, the two or more detectors are preferably arranged to extend over the entire width of the sheet material.

The light source of the inspection station may be light in the visible range. Alternatively, the light is in the ultrared or UV range of the light spectrum. The light source may be chosen depending on the information that shall be gained from the inspected sheet material. Preferably, the light is of a wavelength where it has good absorption or reflection by the dust or debris particles on the crimped surface of the sheet material.

Preferably, visible light or UV light is used for inspecting the sheet material. Most preferably, the light source is a UV light source. Advantageously, in addition UV light has a sterilizing effect on the sheet material when illuminating the sheet material with the UV light. This sterilizing effect, in particular germicidal effect, is particularly advantageous when the sheet material is used for example in the food or medical industry.

In preferred embodiments of the inspection station, two or more light sources are arranged distanced from each other and preferably along a transport path of the sheet material. The two or more light sources are arranged to illuminate the sheet material in the inspection location from two or more different angles. Preferably a first illumination angle is in transport direction of the sheet material and a second illumination angle is towards the transport direction of the sheet material. By this, the sheet material is illuminated from at least two sides in the transport location such that illumination of the sheet material in the inspection location is optimized and interference effects from external light sources are reduced or eliminated.

According to the invention, there is also provided a method for inspecting a sheet material, preferably a crimped sheet material or a continuous sheet material, more preferably a crimped continuous sheet material. The method comprises providing a sheet material and vibrating said sheet material in at least an inspection location of an inspection station and illuminating the sheet material in the inspection location with light. The method further comprises detecting light received from the vibrated sheet material, preferably with a camera, representing images of the sheet material, and determining from images of the sheet material loose material present on the sheet material, thereby allowing for providing a true status of the crimped surface of the crimped sheet material, where information of the loose material has been eliminated. Thus, in the method information in an image resulting from loose material is calculated out of the image. By this, an image of the crimped surface may be provided where distorting information based on loose material has been eliminated.

Preferably, the method comprises continuously guiding continuous crimped sheet material through the inspection location such that continuously a true status of the crimped sheet material may be determined and if desired, monitored.

Preferably, the method comprises comparing the true status of the crimped sheet material with reference sheet conditions; and depending on a deviation of the true status from the reference sheet conditions, adapting sheet processing parameters or interrupting a processing of the crimped sheet material. If a deviation of a true status of the crimped sheet material, in particular a crimping effect of the sheet material, deviates from a reference sheet condition, sheet processing parameters may be adapted. For example, a transport speed, a tensioning force, a heating temperature, a forming or similar of the sheet material may be adapted. In particular, a crimping parameter of the sheet material may be adapted. For example, a distance between two crimping elements of a pair of crimping elements, such as a pair of crimping rollers, may be adapted. In particular, the nip between the two crimping roller may be made smaller or may be made larger. Alternatively, or in addition, if a deviation of a true status of the sheet material, in particular a crimping effect of the sheet material deviates from a reference sheet condition, the sheet processing may be interrupted. This may prevent that further defective sheet material or sheet material with low quality is manufactured.

Preferably, an adaption or interruption of the process is made dependent on the magnitude of the deviation. For example, if the magnitude of the deviation is above or below a certain threshold but still within a certain range, the process is adapted or preferably at least the deviation is recorded. If the magnitude of the deviation is outside said range preferably the process is interrupted.

Preferably, the method further comprises detecting light from the vibrated crimped sheet material under different angles. A light detection under different angles allows to determine a three-dimensional image of the sheet material surface.

Preferably, the method further comprises sterilizing the sheet material by illuminating the sheet material with UV light. Preferably, the UV light is also used for sheet material inspection purposes.

The method according to the invention may basically be used in any sheet material processing method where a sheet material is treated and processed and where the results of the material processing shall be improved. In particular, the method may be used where the detection or evaluation of the quality of a surface structure of a sheet material is at least partially obstructed by loose material like, for example, dust and debris. Preferably, the method is used in a sheet material processing method where the sheet material is mechanically treated like, for example, crimped. Preferably, the method is used for the inspection of continuous sheet material used in the manufacture of aerosol-forming articles, for example a polylactic acid (PLA) foil.

Preferably, the method comprises crimping continuous sheet material before vibrating the crimped sheet material and providing the crimped sheet material to the inspection station, where the crimped and vibrated sheet material is inspected.

The method may further comprise measuring a plurality of sheet parameters, for example thickness, transport speed or tension of the sheet material. In the method, the measured sheet parameters may additionally be used to determine an extended status of the sheet material; comparing the extended status of the sheet material with reference sheet conditions, and depending on a difference of the extended status and the reference sheet conditions, adapting sheet processing parameters or interrupting a processing of the sheet material.

In these embodiments of the method, in addition to the data determined in the inspection station, also additional sheet parameters, for example additional data gained from one or more sensors provided in the sheet processing method, may be used for adapting or interrupting the sheet processing.

Preferably, such additional sheet parameters are gained in or close to the inspection station. Preferably, the sheet parameters are provided with time information in order to assign the sheet parameters of a specific portion of sheet material to the same portion of sheet material inspected in the inspection station.

An adaption or interruption of a process may then be made dependent on a wider range of available sheet information, thus on surface images as well as on further sheet parameters. An interruption of the process may, for example, be initialized if three of the measured or determined values are outside a specific range, while interruption is not initialized if only two of the measured or determined values are outside the specific range.

The information determined from the inspection station and the different sheet parameters may for example also have weighted relevance, for example one of the measured or determined value may be more relevant for a final result to be achieved, another determined or measured value may be less relevant. Correspondingly, the relevance of a more important parameter can have a greater bearing on the decision whether the process should be interrupted than a less important parameter. For example, for the more important parameter a deviance of two percent from a target value may trigger an interruption. For a less important parameter, interruption would for example be triggered only when the less important parameter deviates by five percent from the target value or when two less important parameters deviate by four percent.

A status of the sheet material may correspond to a true status. A true status of the sheet material corresponds to the status of the sheet material determined by the inspection station based on images from the surface of the sheet material. A true status represents the status of the surface, preferably the crimped surface, of the sheet material, preferably without the presence of any loose material. Information on loose material is eliminated from any detected or determined image data in order to get a true status of the surface of the crimped sheet material. The true status is in particular representative for the quality of a crimping process of a sheet material.

A status of the sheet material may also correspond to an extended status of the sheet material. An extended status of the sheet material corresponds to the true status of the sheet material (determined by the inspection station) combined with the status of the sheet material determined by at least one additional sheet parameter, preferably measured by one or several sensors. An extended status of the sheet material thus comprises information gained from the visual inspection of the sheet material as well as information of additional sheet parameters, such as for example, temperature, tensioning or speed.

Sheet material may be introduced into the inspection station continuously or stepwise. Sheet material may be passed through the inspection station automatically or manually.

Preferably, sheet material is introduced into the inspection station continuously and automatically.

The invention also relates to an apparatus for manufacturing and inspecting crimped continuous sheet material, preferably for manufacturing a rod-shaped continuous article from a crimped continuous sheet material.

The apparatus comprises a crimping device for crimping continuous sheet material and further comprises an inspection station according to the invention and as described herein. The inspection station is arranged downstream of the crimping device.

Preferably, the apparatus also comprises a rod-forming device for forming a continuous rod of the crimped continuous sheet material. In these embodiments the inspection station is arranged between the crimping device and the rod-forming device.

Preferably, the apparatus comprises a sheet transport device. Preferably, the sheet transport device is interruptible by the controller of the inspection station. Such an interruption is preferably depending on a true status of the sheet material derived from the images of the sheet material. Additionally or alternatively, the interruption is dependent on a magnitude of a deviation of the images of the sheet material or of a deviation of measured or determined sheet parameters from reference sheet conditions. Additionally or alternatively, the interruption is dependent on an extended status of the sheet material taking the true status of the sheet material into account and additionally also taking measured or determined sheet parameters into account.

Preferably, crimping parameters of the crimping device, in particular a distance of crimping elements of a pair of crimping elements, are adaptable by the controller of the inspection station. A distance between crimping elements has among other effects, an effect on a crimping depth of the sheet material.

Such an adaption is preferably depending on a true status of the sheet material derived from the images of the sheet material or on a magnitude of a deviation of the images of the sheet material from reference sheet conditions. An adaption may also depend on a combination of true status of the sheet material and magnitude of a deviation of the images of the sheet material.

Correspondingly, an adaption may also depend on the extended status of the sheet material, on a magnitude of a deviation of measured or determined sheet parameters from reference sheet conditions or on a combination of extended status and magnitude of a deviation of measured sheet parameters from reference sheet conditions.

Preferably, the apparatus comprises at least one sensor for measuring or determining at least one sheet parameter. Preferably, several sheet parameters are measured or determined. For example, a plurality of sensors is provided for measuring or determining a plurality of sheet parameters such as for example tension, speed or thickness of the sheet material.

Preferably, one or more sensors are arranged in or close to the inspection station. More preferably, one or more sensors are arranged upstream of the inspection station.

Features and elements mentioned and described relating to the inspection station also relate to the method and the apparatus of the present invention and vice versa where applicable.

'Crimping' is herein understood as a regular longitudinal structure in the sheet material, preferably caused by passing the sheet material between one or several pairs of structured rollers. The sheet material may, for example, also be passed between two structured plates. Accordingly, a 'crimping effect' is the structure on the surface of the sheet material after having passed a crimping device. The crimped sheet material comprises grooves with a defined depth. This depth is referred to as the crimping depth.

Image processing and image evaluation may be performed with known means for image processing and image evaluation. For example, image processing may use filters such as black and white, contrast, brightness or saturation. After such an image processing, the loose material may be digitally removed by comparing images of two cameras and identifying the displaced loose material and the background. Image evaluation may be performed by computer and online or manually by comparison with a reference sample. Depending on a user's need the appropriate evaluation method may be chosen.

Online image evaluation may for example include measuring a density of each crimping line, a density of the crimping lines, distance between crimping lines etc. The result of this image evaluation may then be used to give feedback to a sheet material processing apparatus, in particular to a crimping device to set up the parameters for crimping.

The invention is further described with regard to embodiments, which are illustrated by means of the following drawings, wherein.

Figure 1:
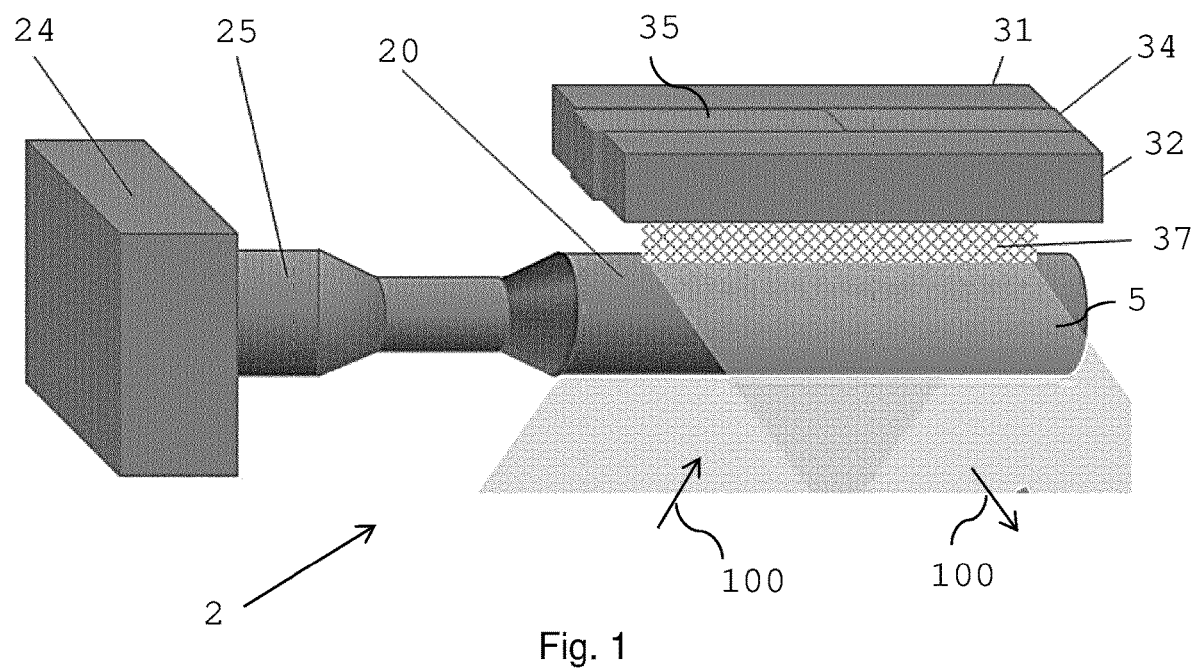
FIG. 1 is a perspective view of an inspection station.

FIG. 1 shows an inspection station 2 comprising a vibrating device and an illumination and detection device. A continuous sheet material 5, for example a crimped sheet of PLA foil, is guided between the cylindrical bar 20 of the vibrating device and the illumination and detection device.

The vibrating device comprises an ultrasonic transducer 24, a transitional section 25 and the cylindrical bar 20. The cylindrical bar 20 is in contact with the sheet material 5 and vibrates the sheet material. The transitional section is typically vibrating at a low amplitude, while the cylindrical bar in contact with the sheet material is preferably vibrating with a high amplitude, preferably, between about 5 micrometres and 10 micrometres. The cylindrical bar 20 may be a solid body made of metal. The transitional section 25 is preferably chosen to amplify a resonance frequency between 20 kHz and 70 kHz, for example 35 kHz with a wavelength up to 200 nm. The cylindrical bar 20 may also be realized in different shapes, for example in a rectangular block shape.

The illumination and detection device is arranged above and distanced to the cylindrical bar 20.

A linear camera array with two linearly arranged cameras 34,35 is arranged between two light emitting bars 31,32, preferably UV light. The camera array and the two light emitting bars 31,32 are arranged parallel to the cylindrical bar 20 and transverse to the transport path of the sheet material 5.

Preferably, the camera array captures a sequence of images from the illuminated sheet material 5. The light reflected from the sheet material 5 and progressing to the cameras 34,35 is indicated by reference sign 37. Each camera 34,35 captures the surface of the sheet material 5 from a different angle in order to get a different perspective of the surface. The two UV light emitting bars 31,32 illuminate the sheet material 5 from different angles, thereby reducing light interference with another light source.

The cylindrical bar 20 transmits the frequency to the sheet material 5. Through the tension of the sheet material 5, vibration is generally not visible, however, semi or complete loose material is affected and is agitated by the vibration. The vibration of the loose material unveils the crimp ridges previously covered by loose material. This reduces the risk of misinterpretation of the visual image of the surface of the sheet material 5.

The captured images may be processed in a computer system (not shown) or directly in a controller of an apparatus as described below. Pictures from both cameras 34,35 are combined in order to determine the geometry of the crimping effect of the inspected sheet material 5 and also to identify loose material on the surface of the sheet material 5 or pollution of and defects in the sheet material 5.

Preferably, the UV light has a wavelength between 100 nm and 300 nm, for example 180 nm. The UV light has a germicidal effect on bacteria and other pathogens. Therefore the sheet material may be sterilized, preferably in a continuous mode, while being inspected.

As may be seen from FIG. 1 the inspection station may also be realized and applied independent of further manufacturing or sheet processing steps. For example, premanufactured sheets of foil may be inserted manually into the inspection station were they may be inspected.

Figure 2:
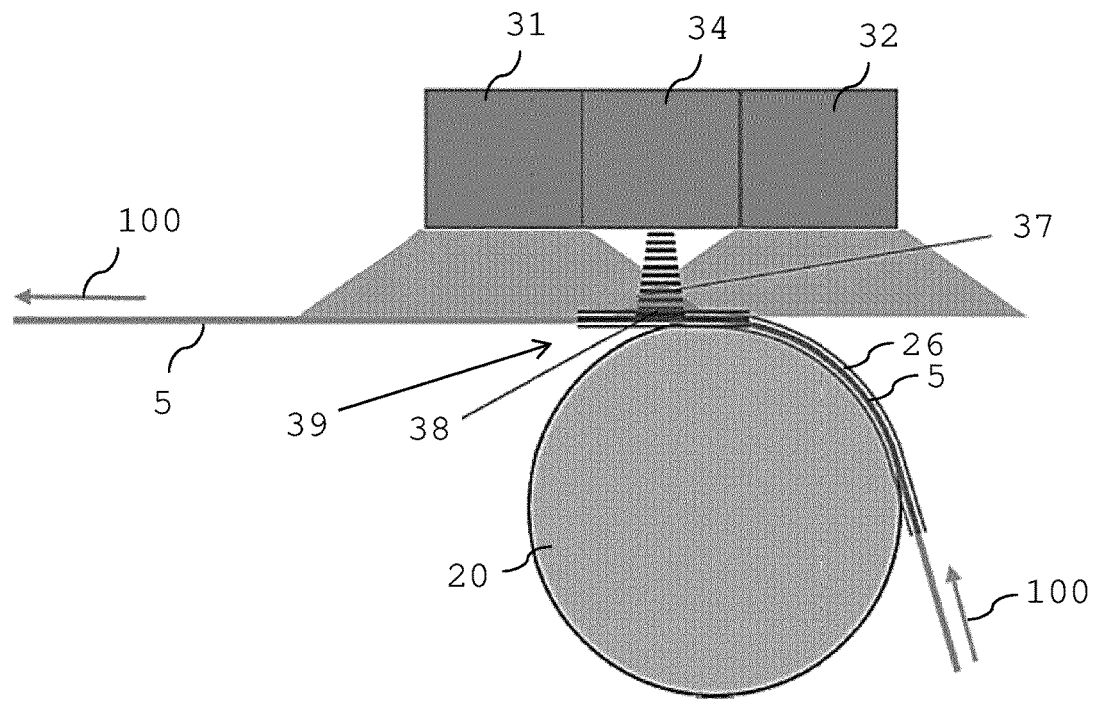
FIG. 2 is a schematic illustration of a side view of the inspection station of FIG. 1.

In FIG. 2 a schematically drawn side view of the inspection station 2 of FIG. 1 is shown. Same reference numbers are used for same elements.

The sheet material 5 is guided over the cylindrical bar 20 in transport direction 100. Thereby, the sheet material 5 is guided from below the bar 20 coming in contact with the bar 20 and is guided around the bar 20 to the inspection location 39. In FIG. 2 the transport direction 100 leads upwards to the cylindrical bar 20 and is basically arranged horizontally when entering the inspection location 39 and after having left the inspection station 2. The inspection location 39 is arranged slightly displaced in a downstream direction from the center of the cylindrical bar 20. The area of image capturing 38 is arranged in the center of the inspection location 39 and is arranged close to and downstream of the center of the bar 20 when seen in transport direction 100. The area of image capturing 38 is substantially arranged downstream of a contact area of sheet material 5 and bar 20. The area of ultrasonic excitation 26 of the sheet material 5 drawn as double lines extends essentially from shortly before the sheet material 5 contacts the cylindrical bar 20 to shortly downstream of the position of the bar 20 when the sheet material 5 has no physical contact anymore with the cylindrical bar 20.

The two light sources 31,32 illuminate the sheet material 5 from upstream and downstream of the inspection location 39.

Light 37 from the inspection location and from a region on the sheet material 5, where light from the two light sources 31,32 interferes, emits to the cameras 34,35, where the emitted light is detected. The cameras 34,35 are arranged between the two light sources 31,32.

If the sheet material 5 is a translucent material, such as a PLA foil, a crimping effect on a bottom side of the foil is also captured by the cameras 34,35.

Figure 3:
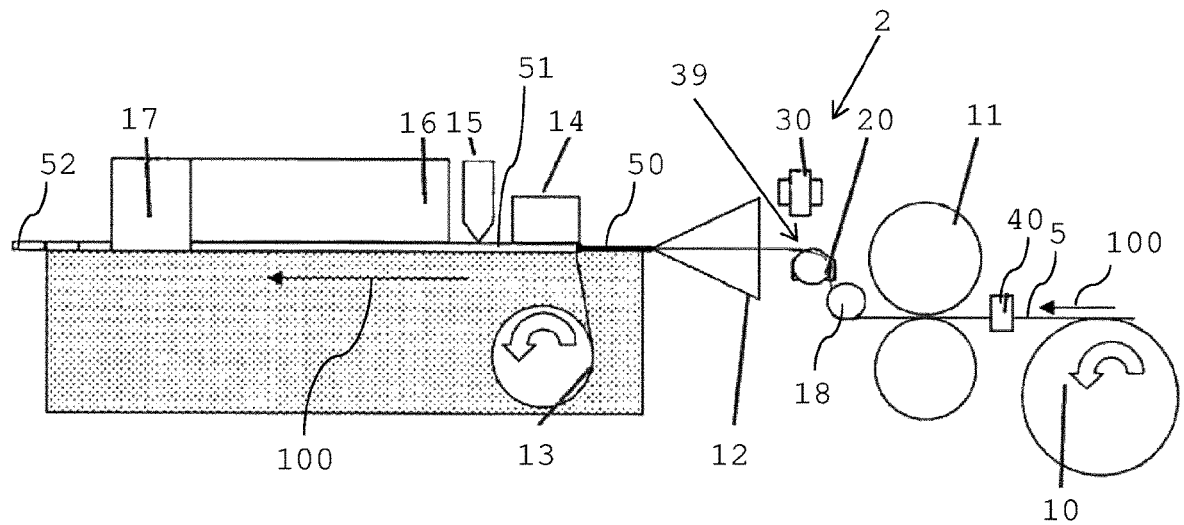
FIG. 3 shows a rod-forming apparatus.

The apparatus shown in FIG. 3 generally comprises: supply means for providing a continuous sheet of a PLA material or another sheet material used in the manufacture of filters or other segments of aerosol-generating articles used in electronic aerosol-generating devices; crimping means for crimping the continuous sheet material; rod forming means for gathering the continuous crimped sheet material and circumscribing the gathered material with a wrapper to form a continuous rod; and cutting means for severing the continuous rod into a plurality of discrete rods. The apparatus also comprises transport means for transporting the continuous sheet material downstream through the apparatus from the supply means to the rod forming means via the crimping means.

Other suitable materials are polypropylene film, polyethylene film, pet polyethylene terephthalate film, polyester film or cellulose acetate film. As shown in FIG. 3, the supply means for providing a continuous sheet of for example PLA material comprises a continuous sheet material 5 mounted on a bobbin 10. The crimping means comprises a pair of rotatable crimping rollers 11. In use, the continuous sheet material 5 is drawn from the bobbin 10 and transported downstream to the pair of crimping rollers 11 by the transport mechanism for example via a series of guide and tensioning rollers (not shown). As the continuous sheet material 5 is fed between the pair of crimping rollers 11, the crimping rollers engage and crimp the continuous sheet material 5 to form a continuous crimped sheet material having a plurality of spaced-apart ridges or corrugations substantially parallel to the longitudinal axis of the sheet material through the apparatus.

The continuous crimped sheet material 5 is transported downstream from the pair of crimping rollers 11 towards the rod forming means. The continuous sheet material 5 is fed through a converging funnel or horn 12. The converging funnel gathers the continuous sheet material 5 transversely relative to its longitudinal axis. The continuous sheet of material 5 assumes a substantially cylindrical configuration as it passes through the converging funnel 12.

Upon exiting the converging funnel 12, the gathered sheet of PLA 50 is wrapped in a continuous sheet of wrapping material. The continuous sheet of wrapping material is fed from a bobbin 13 and enveloped around the gathered continuous crimped sheet material by an endless belt conveyor or garniture 14. As shown in FIG. 3, the rod forming means comprises an adhesive application means 15 that applies adhesive to one of the longitudinal edges of the continuous sheet of wrapping material, so that when the opposed longitudinal edges of the continuous sheet of wrapping material are brought into contact they adhere to one other to form a continuous rod.

The rod forming means further comprises a drying means 16 downstream of the adhesive application means 15, which in use dries the adhesive applied to the seam of the continuous rod as the continuous rod is transported downstream from the rod forming means to the cutting means 17. The drying means preferably comprise heating and compression means such that the wrapped rod of sheet material 51 is fixed in its final rod shape.

The cutting means 17 normally comprises a rotary cutter that severs the wrapped continuous rod 51 into a plurality of discrete rods 52 of unit length or multiple unit length.

The apparatus shown in FIG. 3 further comprises an inspection station 2 located between the crimping means and the rod forming means for inspecting the crimped continuous sheet material before it is gathered transversely relative to the longitudinal axis thereof by the converging funnel 12.

Preferably, the inspection station 2 is an inspection station as described and shown in FIG. 1 and FIG. 2. The continuous sheet material 5 is guided and deflected via guide roll 18 such that the sheet material 5 is then fed from below over the cylindrical shaped vibrating element 20 of the inspection station 2. The sheet material 5 proceeds through the inspection location below the illumination and detection unit 30 of the inspection station 2. Information gained on the crimped sheet material 5 by the inspection station 2 is sent to a control unit (not shown).

The apparatus shown in FIG. 3 also comprises a sensor unit 40 arranged upstream of the crimping rollers 11. The sensor unit 40 may comprise one, preferably several sensors for measuring or detecting physical parameters of the sheet material 5. Such parameters may, for example, be the thickness of the sheet material, the tensioning or the speed of the sheet material 5. Accordingly, the sensor unit 40 may comprise a thickness sensor and a speed sensor. The data measured by the sensors of the sensor unit 40 are provided with a time stamp, which is also sent to the control unit for further processing.

Figure 4:
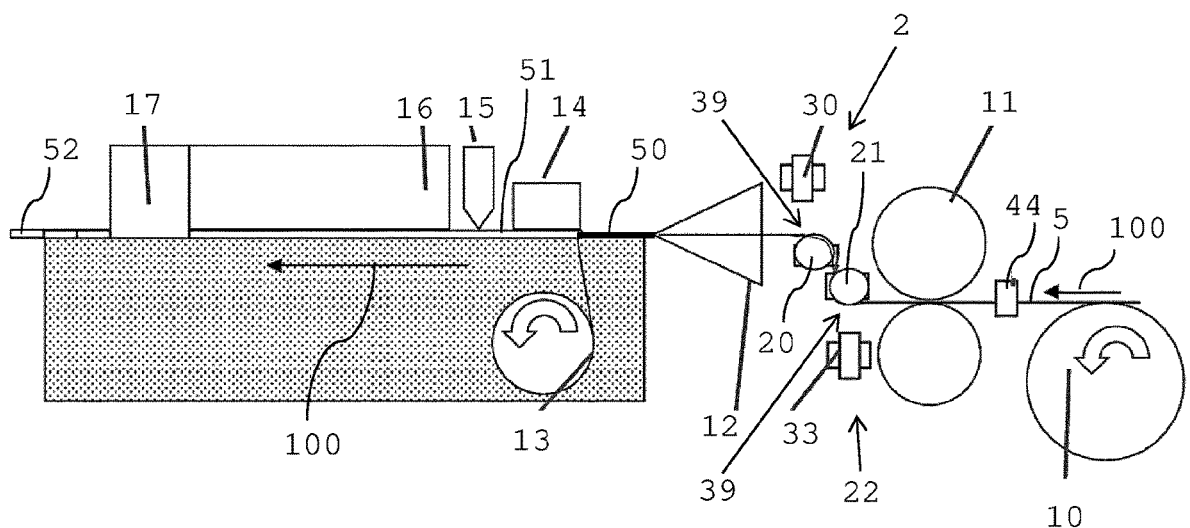
FIG. 4 shows another rod-forming apparatus.

FIG. 4 shows a rod-forming process, however, with two inspection stations 2,22 arranged in series. The other apparatus parts are basically identical to the apparatus parts of the apparatus shown and described with reference to FIG. 3. Guide roll 18 of the apparatus shown in FIG. 3 is replaced by a cylindrical bar 21 of a vibrating device. An illumination and detection unit 33 assigned to the cylindrical bar 21 is arranged below the transport path of the sheet material 5, as the sheet material 5 is guided horizontally below the cylindrical bar 18 and guided around the bar 18 to come in contact with the cylindrical bar 20 of the other inspection station arranged further downstream.

In FIG. 4, the same reference numbers are used for the same elements and the same apparatus parts.

The second inspection station is inspecting the other side of the PLA from below, in a case where the material is opaque or a single inspection station is insufficient to inspect both surfaces.

Preferably, the second inspection station 22 is arranged below the cylindrical bar 21, and upstream of the cylindrical bar 20 with a preferred distance between the inspection stations of about between 20 centimetres and 50 centimetres.

Figure 5:
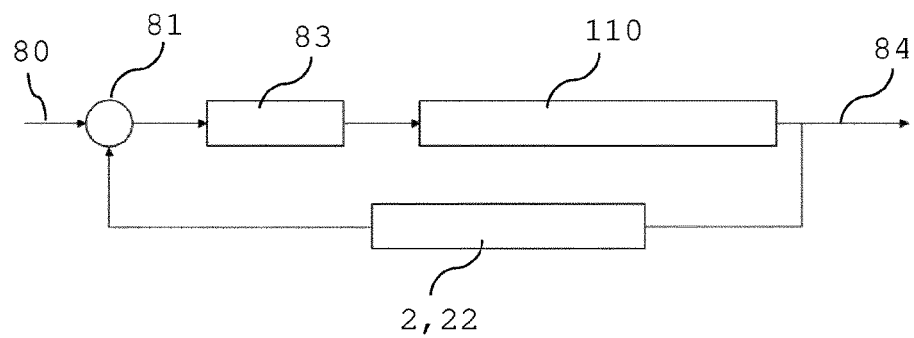
FIG. 5 is a schematic illustration of a control process for sheet material.

In FIG. 5 an example of a control loop is shown in a simplified manner.

Data from an on-line inspection station 2,22 is sent to a computer system 81 for data evaluation. Also target values, for example reference sheet conditions, are sent to the computer system 81. The result of this evaluation may be used for a feedback to the sheet processing apparatus, in particular to the crimping device. If the result of the evaluation in the computer system 81 indicates a deviation from a desired result, this information is sent to the controller 83. The controller then initiates a change of the nip 110 between crimping rollers. The resulting adapted crimped sheet material 84 is inspected in the inspection station 2,22 and the loop starts anew. In case of inacceptable non-conformity, in that a deviation from a desired result cannot be corrected by changing equipment parameters, the data from the computer system 81 will also be sent to the controller 83, which controller then stops the production equipment such that no non-conform products are manufactured.

The computer system 81 may, for example, generate a status report about sensor data and a collection of images. This may shorten downtime of the apparatus. The computer system may be an integral part of the controller or may partly also be arranged in the detection system of the inspection station 2,22.

The invention claimed is:

1. An inspection station for inspecting crimped sheet material, the station comprising:
  a light source arranged to illuminate crimped sheet material in an inspection location; a vibrating device adapted to vibrate crimped sheet material in the inspection location for dislodging loose material on the surface of the sheet material in the inspection location, wherein the vibrating device comprises an ultrasonic transducer and a vibrating element in the form of a bar, wherein crimped sheet material is guidable along or over the vibrating element for the crimped sheet material to be vibrated by the vibrating element;
  a detector for detecting light received from the vibrated crimped sheet material, thereby providing images of the crimped sheet material;
  a controller adapted to determine from images of the crimped sheet material loose material on the crimped surface of the crimped sheet material, and adapted to provide a true status of the crimped surface of the crimped sheet material, the true status representing the surface of the crimped sheet material without loose material.

2. The inspection station according to claim 1, wherein the vibrating element is a cylindrical bar.

3. The inspection station according to claim 1, wherein the detector is a camera adapted to detect light from the vibrated crimped sheet material.

4. The inspection station according to claim 1, comprising two detectors or more detectors for detecting light received from the vibrated crimped sheet material under different angles.

5. The inspection station according to claim 1, wherein the light source is a UV light source.

6. An apparatus for manufacturing and inspecting crimped continuous sheet material, the apparatus comprising a crimping device for crimping continuous sheet material, and further comprising an inspection station according to claim 1 arranged downstream of the crimping device.

7. The apparatus according to claim 6, wherein crimping parameters of the crimping device are adaptable by the controller of the inspection station.

8. The apparatus according to claim 6, comprising at least one sensor for measuring or determining at least one sheet parameter.

9. A method for inspecting a crimped sheet material, the method comprising:
  providing a crimped sheet material and vibrating said crimped sheet material in at least an inspection location of an inspection station by guiding the crimped sheet material over or along a vibrating element, thereby dislodging loose material on the surface of the sheet material during the inspection process;
  illuminating the crimped sheet material in the inspection location with light;
  detecting light received from the vibrated crimped sheet material representing images of the crimped sheet material;
  determining from images of the crimped sheet material loose material present on the crimped sheet material, thereby providing a true status of the crimped surface of the crimped sheet material, the true status representing the surface of the crimped sheet material without loose material.

10. The method according to claim 9, further comparing the true status of the crimped sheet material with reference sheet conditions;
  depending on a deviation of the true status from the reference sheet conditions, adapting sheet processing parameters or interrupting a processing of the crimped sheet material.

11. The method according to claim 9, further comprising detecting light from the vibrated crimped sheet material under different angles.

12. The method according to claim 9, further comprising sterilizing the crimped sheet material by illuminating the crimped sheet material with UV light.

13. The method according to claim 9, wherein the crimped sheet material is a continuous crimped sheet material used in the manufacture of aerosol-forming articles, for example a polylactic acid (PLA) foil.

14. The method according to claim 9, further comprising measuring a plurality of sheet parameters, including thickness, transport speed, or tension; additionally using the measured sheet parameters and determining an extended status of the crimped sheet material;
  comparing the extended status of the crimped sheet material with reference sheet conditions, and depending on a difference of the extended status and the reference sheet conditions, adapting sheet processing parameters or interrupting a processing of the crimped sheet material.

* * * * *